United States Patent [19]

Matzner et al.

[11] Patent Number: 4,619,975

[45] Date of Patent: Oct. 28, 1986

[54] NOVEL POLY(ARYL ETHER)- POLYESTER BLOCK COPOLYMERS

[75] Inventors: Markus Matzner, Edison, N.J.; Donald M. Papuga, Danbury, Conn.

[73] Assignee: Union Carbide Corporation, Danbury, Conn.

[21] Appl. No.: 772,881

[22] Filed: Sep. 5, 1985

[51] Int. Cl.[4] ............................................. C08G 81/00
[52] U.S. Cl. .................................... 525/437; 525/534
[58] Field of Search ............................. 525/437, 534

[56] References Cited

U.S. PATENT DOCUMENTS

| | | | |
|---|---|---|---|
| 4,093,675 | 6/1978 | Schure et al. | 525/437 |
| 4,119,607 | 10/1978 | Gergen et al. | 525/437 |
| 4,297,455 | 10/1981 | Lindner et al. | 525/437 |
| 4,436,893 | 3/1984 | Cholod | 525/437 |
| 4,444,960 | 4/1984 | Salee et al. | 525/534 |
| 4,460,736 | 7/1984 | Froix et al. | 525/437 |

*Primary Examiner*—Lucille M. Phynes
*Attorney, Agent, or Firm*—Donald M. Papuga

[57] ABSTRACT

Described herein are novel block copolymers wherein one block is a poly(aryl ether) oligomer and the other block is a liquid crystalline polyester oligomer. Processes for the preparation of the subject copolymers are also described. The novel block copolymers display excellent mechanical properties, good high temperature stability and excellent solvent and chemical resistance.

38 Claims, No Drawings

NOVEL POLY(ARYL ETHER)- POLYESTER BLOCK COPOLYMERS

FIELD OF THE INVENTION

This invention is directed to novel block copolymers wherein one block is a poly(aryl ether)oligomer and the other block is a liquid crystalline polyester oligomer. Processes for the preparation of the subject copolymers are also described. The novel block copolymers display excellent mechanical properties, good high temperature stability and excellent solvent and chemical resistance.

BACKGROUND OF THE INVENTION

Poly(aryl ethers) have been known for about two decades; they are tough linear polymers that possess a number of attractive features such as excellent high temperature resistance, good electrical properties, and very good hydrolytic stability. Two poly(aryl ethers) are commercially available. A poly(aryl ether sulfone) is available from Imperial Chemical Industries Limited. It has repeating units of the following formula (1):

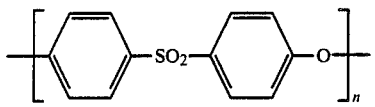

It is produced by the polycondensation of 4-(4'-chlorophenylsulfonyl)phenol, as described in British Patent Specification No. 1,153,035. The polymer contains no aliphatic moieties and has a heat deflection temperature of approximately 210° C. The other commercially available poly(aryl ether sulfone) is available from Union Carbide Corporation under the trademark UDEL ®. It has a heat deflection temperature of about 180° C. and repeating units of the following formula (2):

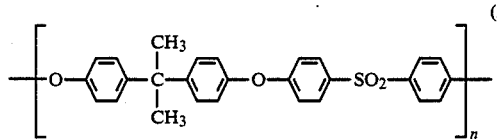

However, the solvent and chemical resistance of the poly(aryl ether sulfones) are only marginal.

Liquid crystalline aromatic polyesters are well known in the art. These liquid crystalline polyesters are described in, for example, U.S. Pat. Nos. 3,804,805; 3,637,595; 4,130,545; 4,161,470; 4,230,817 and 4,265,802. The liquid crystalline polyesters are characterized in that they exhibit optical anisotropy in the melt phase. Liquid crystalline polyesters are ordered, high strength materials, having very good high temperature properties; they are particularly suitable for high strength fibers and filaments. Their main drawback as molding materials resides in the anisotropy of properties displayed by molded parts. An excellent overview of liquid crystalline polyesters was published recently, see W. J. Jackson, Jr., Journal of Applied Polymer Science, Applied Polymer Symposium 41, 25-33 (1985).

THE INVENTION

The present invention is directed to novel block copolymers of poly(aryl ethers) and liquid crystalline polyesters. Processes for the preparation of the subject copolymers are also described. Due to the highly crystalline nature of the polyester blocks, the copolymeric materials of the instant invention are phase separated. The poly(aryl ether) rich products are thus an amorphous (or crystalline) poly(aryl ether)matrix that contains dispersed in it and chemically bound to it, the highly oriented crystalline domains of the liquid crystalline polyester. The materials are essentially molecular composites which show improved mechanical properties. An important mechanical property advantage is the fact that molded parts are significantly less anisotropic than those obtained from the unmodified liquid crystalline polyester. Unexpectedly, good solvent and chemical resistance are also observed with these composites, even though the liquid crystalline phase is not the continuous phase. On the other end of the compositional spectrum, i.e., for the polyester-rich block copolymers, the anisotropy of the molded parts is also decreased, though to a lesser extent. Again, the products display very good solvent and chemical resistance.

Another advantage of the block copolymers of this invention is their relatively low melt viscosity which allows for easy fabricability. The polymers, as pointed out above, have very good mechanical properties and retain the favorable high temperature characteristics of the constituents.

Finally, due to the chemical bond between the blocks the overall properties are superior to those displayed by the blends as described in U.S. Pat. No. 4,460,736.

The block copolymers of the instant invention can be described by the formula $(AB)_z$ where A and B are the poly(aryl ether) and the liquid crystalline polyester blocks, respectively; and where z is 1 or greater. The block copolymers may also have the structure $(ABC)_n$ and $(ABCD)_n$, wherein A, B, and n are as defined above, and C and D are poly(aryl ether ketone) and liquid crystalline polyester blocks, different from the blocks A and B.

The poly(aryl ether)oligomers suitable for the purposes of this invention are linear themoplastic polyarylene polyethers containing recurring units of the formula:

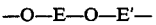

—O—E—O—E'— wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyether resins described in, for example, U.S. Pat. Nos. 3,264,536 and 4,175,175. It is preferred that the dihydric phenol be a weakly acidic dinuclear phenol such as, for example, the dihydroxyl diphenyl alkanes or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as, for example, ether oxygen (—O—), carbonyl

sulfone

or hydrocarbon residue in which the two phenolic nuclei are joined to the same or different carbon atoms of the residue.

Such dinuclear phenols can be characterized as having the structure: wherein Ar is an aromatic group and preferably is a phenylene group, $R_1$ and $R'_1$ can be the same or different inert substituent groups such as alkyl groups having from 1 to 4 carbon atoms, aryl, halogen atoms, i.e., fluorine, chlorine, bromine or iodine, or alkoxyl radicals having from 1 to 4 carbon atoms, the c's are independently integers having a value of from 0 to 4, inclusive and $R_2$ is representative of a bond between aromatic carbon atoms as in dihydroxyl-diphenyl, or is a divalent radical, including for example, radicals such as

—O—, —S—, —S—S— —SO—, —SO$_2$, and divalent hydrocarbon radicals such as alkylene, alkylidene, cycloalkylene, cycloalkylidene, or the halogen, alkyl, aryl or like substituted alkylene alkylidene and cyloaliphatic radicals as well as aromatic radicals and radicals fused to both Ar groups.

Examples of specific dihydric polynuclear phenols include among others: the bis-(hydroxyphenyl)alkanes such as
2,2-bis-(4-hydroxyphenyl)propane,
2,4'-dihydroxydiphenylmethane,
bis-(2-hydroxyphenyl)methane,
bis-(4-hydroxyphenyl)methane.
bis(4-hydroxy-2,6-dimethyl-3-methoxyphenyl)methane,
1,1-bis-(4-hydroxy-phenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxy-naphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydroxyphenyl)1,1,1,3,3,3,-hexafluroropropane and the like;
di(hydroxyphenyl)sulfones such as
bis-(4-hydroxyphenyl)sulfone, 2,4'-dihydroxydiphenyl sulfone, 5-chloro-2,4'-dihydroxydiphenyl sulfone, 5'-chloro-4,4'-dihydroxydiphenyl sulfone, and the like;
di(hydroxyphenyl)ethers such as
bis-(4-hydroxyphenyl)ether, the 4,3'-, 4,2'-2,2'-2,3'-,dihydroxyphenyl ethers,
4,4'-dihydroxyl-2,6-dimethyldiphenyl ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether, and
4,4'-dihydroxyl-3,6-dimethoxydiphenyl ether.

As herein used the E term is defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through aromatic ether oxygen atoms.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho or para to the halogen or nitro group. The dihalobenzoid or dinitrobenzenoid compound can be either mononuclear, where the halogens or nitro groups are attached to the same benzenoid ring; or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

An electron withdrawing group is employed as the activator groups in these compounds. It should be, of course, inert under the reaction conditions, but otherwise its structure is not critical. Preferred are the strongly activating groups such as the sulfone group

bonding two halogen or nitro substituted benzenoid nuclei, as in 4,4'-dichlorodiphenyl sulfone and 4,4'-diflurodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating groups can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens on two different rings, such as the sulfone group

the carbonyl group

the vinylene group

the sulfoxide group

the azo group —N=N—; the saturated flurocarbon groups

—CF$_2$ —CF$_2$CF$_2$; organic phosphine oxides

where R$_3$ is a hydrocarbon group and the ethylidene group

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The polyarylene polyether oligomers of this invention are prepared by methods well known in the art as for instance the one-step reaction of a double alkali metal salt of a dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt by the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with the dihalobenzenoid or dinitrobenzenoid compound.

Additionally, the polyethers may be prepared by the procedure described in, for example, U.S. Pat. No. 4,176,222 in which at least one bisphenol and at least one dihalobenzenoid are heated at a temperature of from about 100° to about 400° C. with a mixture of sodium carbonate or bicarbonate and a second alkali metal carbonate or bicarbonate having a higher atomic number than that of sodium.

Further, the polyethers may be prepared by the procedures described in Canadian Pat. No. 847,963 wherein the bisphenol and dihalobenzenoid compound are heated in the presence of potassium carbonate using a high boiling solvent such as diphenylsulfone.

Preferred polyarylene polyethers of this invention are those prepared using the dihydric polynuclear phenols of the formulae (3)–(7) including the derivatives thereof which are substituted with inert substituent groups;

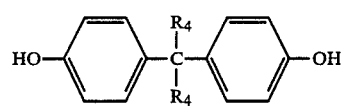 (3)

in which the R$_4$ groups represent independently hydrogen, lower alkyl, aryl, and the halogen substituted groups thereof, which can be the same or different;

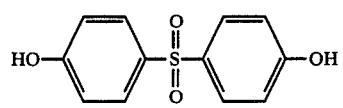 (4)

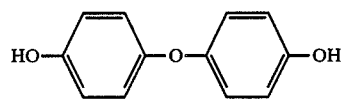 (5)

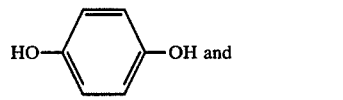 (6)

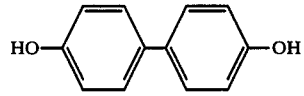 (7)

and substituted derivatives thereof.

It is also contemplated in this invention to use a mixture of two or more different dihydric phenols to accomplish the same ends as above. Thus when referred to above the —E— residuum in the polymer structure can actually be the same or different aromatic residua.

The preferred dichlorobenzenoid compounds are (8), (9), (10) and (11); they may carry inert substituent groups.

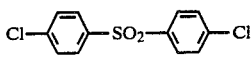   (8)

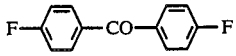   (9)

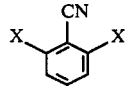   (10)

where X = Cl or F

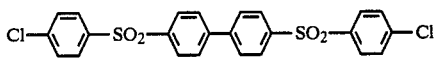   (11)

The most preferred poly(aryl ether)oligomers have the repeating units (12), (13), (14), and (15).

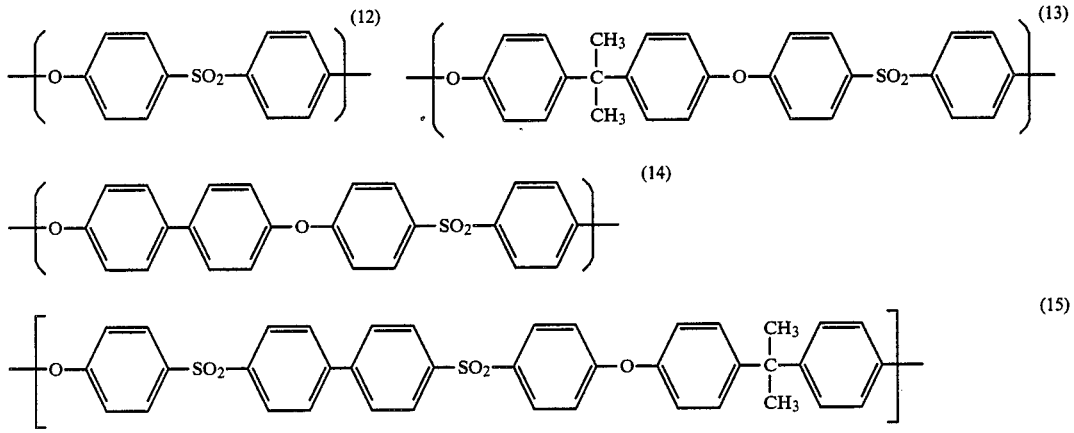

The poly(aryl ether) blocks have number average molecular weights of at least 1,000, preferably of at least 1,500, and most preferably of at least 2,000.

The liquid crystalline polyarylate oligomers which may be used herein are well known in the art. These liquid crystalline polyarylates are described in, for example, U.S. Pat. Nos. 3,804,805; 3,637,595, 4,130,545; 4,161,470; 4,230,817 and 4,265,802. Preferably, the liquid crystalline polyarylates are derived from one or more of the following: p-hydroxy benzoic acid, m-hydroxy benzoic acid, terephthalic acid, isophthalic acid hydroquinone, phenyl hydroquinone, alkyl substituted hydroquinones, halo substituted hydroquinones, 4,4'-dihydroxydiphenyl ether, resorcinol, 4,4'-biphenol, 2,6-naphthalene diol, 2,6-naphthalene dicarboxylic acid, 6-hydroxy-2-naphthoic acid and 2,6-dihydroxy anthraquinone. Two commercially available liquid crystalline copolyesters are Ekonol, a homopolymer of p-hydroxy benzoic acid, and Ekkcel, a copolymer of p-hydroxybenzoic acid, terephthalic and isophthalic acids, and 4,4'-biphenol. Other liquid crystalline polyarylates of interest include the copolyester of p-hydroxybenzoic acid and 6-hydroxy-2-naphthoic acid in a 75/25 molar ratio.

The liquid crystalline polyester oligomers which may be used as a component of the block copolymers of the present invention are often referred to as oligomers of "wholly aromatic polyesters". They comprise at least two recurring moieties which, when combined in the polyester, have been found to form an atypical anisotropic melt phase. The aromatic polyesters are considered to be "wholly" aromatic in the sense that each moiety present in the polyester contributes at least one aromatic ring to the polymer backbone. Recent publications disclosing such polyesters include (a) Belgian Pat. Nos. 828,935 and 828,936, (b) Dutch Pat. No. 7505551, (c) West German Pat. Nos. 2,520,819; 2,520,820 and 2,722,120, (d) Japanese Pat. Nos. 43-223; 2132-116; 3017-692, and 3021-293, (e) U.S. Pat. Nos. 3,991,013; 3,991,014; 4,057,597; 4,066,620; 4,075,262; 4,118,372; 4,156,070; 4,159,365; 4,169,933 and 4,181,792 and (f) U.K. Application No. 2,002,404.

The preferred polyester oligomers are those derived from Ekonol and Ekkcel, those based on p-hydroxybenzoic acid and 6-hydroxy-2-naphthoic acid mentioned above; and also the terephthalate copolyesters of hydroquinone and phenyl hydroquinone as described in U.S. Pat. No. 4,159,365; the copolyester from terephthalic acid, 2,6-naphthalene dicarboxylic acid and phenyl hydroquinone, as described by W. J. Jackson, Jr., Macromolecules, 16 1027 (1983); the copolyester from terephthalic acid, methyl hydroquinone, and meta-hyroxybenzoic acid, see U.S. Pat. No. 4,146,702. Other preferred liquid crystalline polyester oligomers are derived from the materials described in U.S. Pat. Nos. 4,067,852; 4,083,829; 4,130,545; 4,161,470; 4,184,996; 4,238,599; 4,238,598; 4,230,817; 4,224,443; 4,219,461 and in 4,256,624.

The above-described oligomers, in order to be useful in the present invention, must exhibit optical anisotropy in the melt phase. These polyesters readily form liquid crystals in the melt phase and accordingly exhibit a high tendency for the polymer chains to orient in the shear direction. Such anisotropic properties are manifested at a temperature at which the wholly aromatic polyester readily undergoes melt processing to form shaped articles. The anisotropic properties may be confirmed by conventional polarized light techniques whereby crossed-polarizers are utilized. More specifically, the anisotropic melt phase may conveniently be confirmed by the use of a Leitz polarizing microscope at a magnification of 40X with the sample on a Koffler hot stage and under a nitrogen atmosphere. The melt phases of the wholly aromatic polyesters which are suitable for use in the present invention are optically anisotropic, i.e., they transmit light when examined between crossed-polarizers. By contrast, the melt of a conventional polymer will not transmit appreciable light when placed between crossed-polarizers.

The most preferred liquid crystalline polyester blocks are derived from Ekonol and Ekkcel, and those incorporating units from (16) and (17).

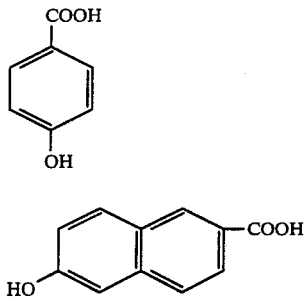

The block copolymers of the present invention are prepared using hydroxyl-terminated poly(aryl ether)oligomers and the appropriate liquid crystal polyester monomers under typical polyester forming conditions. The methods are outlined in the schemes (I)–(III); the symbol $HO(EOE'O)_n EOH$ represents a hydroxyl-terminated poly(aryl ether)oligomer wherein n is such that its number average molecular weight be at least 1,000, preferably at least 1,500, and most preferably at least 2,000.

Scheme I

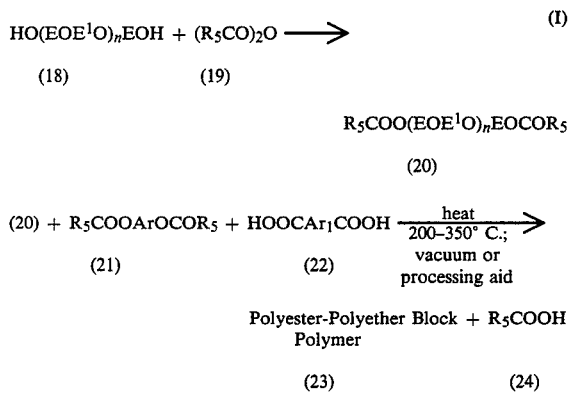

The groups Ar and $Ar_1$ are divalent aromatic radicals which are residues of diphenols and diacids that are suitable components for the liquid crystalline polyester blocks. The method depicted above consists in first preparing an ester of the hydroxyl-containing reactants with a lower mono-carboxylic acid. These esters are then reacted under acidolysis conditions with the acid containing reactants to yield the block copolymer and the lower monocarboxylic acid which can be recycled. The two steps, i.e. the preparation of the monocarboxylic acid esters of the phenolic reactants and their polymerization can be performed separately, or in a one-pot procedure. The acidolysis reaction can be performed in bulk or in the presence of from about 10 to about 60, more preferably from about 25 to about 60, and most preferably, from about 30 to about 60 weight percent, based on the weight of the block copolymer produced, of a processing aid. The preferred processing aids are a diphenyl ether compound as described in U.S. Pat. Nos. 4,294,956 and 4,296,232; a cycloaliphatic substituted aromatic or heteroaromatic compound, as described in U.S. Pat. No. 4,294,957; and a halogenated and/or etherated substituted aromatic or heteroaromatic compound as described in U.S. Pat. No. 4,374,239. The polymerization reaction can also be conducted using a slurry process as described in U.S. Pat. No. 4,083,829.

The lower monocarboxylic acid $R_5COOH$ is preferably acetic acid. The acidolysis reaction is preferably carried out within the temperature range of about 200° to 350° C. However, lower and higher temperatures may also be used. Also, in some instances the molecular weight of the block copolymers may be advanced using solid state techniques of the type described in U.S. Pat. Nos. 4,075,173, 3,780,148, 3,684,766 and 4,314,051. The reaction can be carried out at atmospheric or subatmospheric pressures; it can also be performed under pressures higher than atmospheric.

The acidolysis reaction generally does not require a catalyst. In some instances, however, the use of an appropriate catalyst may prove advantageous. Typical catalysts include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts, such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight Scheme II In this scheme the acid-containing monomers are first transformed into the corresponding diaryl esters. The latter are then submitted to an ester-exchange reaction as shown in the equation below. The two steps can be performed separately or in a one-pot procedure.

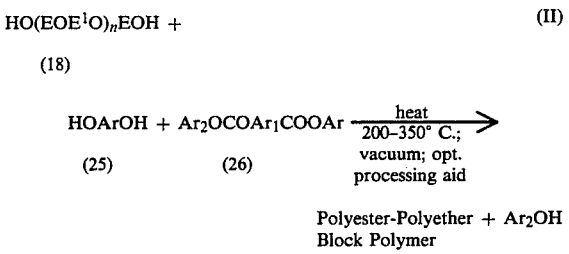

The groups Ar and $Ar_1$ are divalent aromatic radicals as defined above; $Ar_2$ is a monovalent aromatic group, preferably phenyl or tolyl. The reaction can be performed in bulk or in the presence of from about 10 to about 60, more preferably from about 25 to about 60, and most preferably, from about 30 to about 60 weight percent, based as the weight of the block copolymer produced, of a processing aid. The preferred processing aids are a diphenyl ether compound, a cycloaliphatic substituted aromatic or heteroaromatic compound, or a halogenated and/or etherated substituted aromatic or heteroaromatic compound as described in, for example, U.S. Pat. No. 4,459,384.

Preferably, phenyl esters of the carboxylic acids are used. The ester-exchange reaction is generally carried out in the temperature range of 200°–350° C. However, lower or higher temperatures can also be used. Also, in some instances the molecular weight of the block copolymer may be advanced using solid state techniques. The reaction can be performed at atmospheric, reduced, or higher than atmospheric pressures. Catalysts such as, for example, alkali metal phenoxides, may be used to accelerate the polymerization.

Scheme III

In this scheme the acid function is first transformed into the corresponding acid chloride which is then condensed with the phenolic reactant to high polymer. The polymerization is illustrated in equation (III).

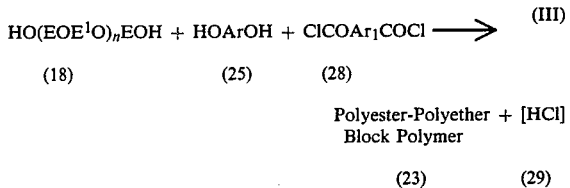

The condensation depicted in the equation above can be performed in a variety of ways. Thus, it can be carried out via the interfacial technique, as described by P. W. Morgan in "Condensation Polymers by Interfacial and Solution Methods", Interscience, New York, 1965. The interfacial method is generally useful; however, in some instances, where the final block polymer has a limited solubility in the solvents generally employed in this type of condensation, only low molecular weight copolymers result.

In such instances it is advantageous to carry out the polycondensation in a high boiling solvent as described, for example, in U.S. Pat. Nos. 3,733,306 and 3,160,602. Typical solvents useful for this type of polymerization are, for example, the chlorinated aromatic hydrocarbons such as chlorobenzene, dichloro-, trichloro-, and tetrachlorobenzenes, chlorinated diphenyls or diphenyl ethers, chlorinated naphthalenes, as well as nonchlorinated aromatics such as terphenyl, benzophenone, dibenzylbenzenes, and the like. The reaction can be run with or without catalysts. Typical catalysts are metallic magnesium, as described in U.S. Pat. No. 3,733,306, tetravalent titanium esters, as described in German Patent Application No. 1,933,687, and the like.

Among the three type of processes, those following Schemes I and II are preferred. The process of Scheme I is most preferred.

The poly(aryl ether) oligomers (18) are prepared by using typical poly(aryl ether) preparative

processes and an excess of diphenol component. The higher the excess of the diphenol the lower the molecular weight of the resulting dihydroxy-terminated oligomer (18).

The number average molecular weight of the liquid crystalline polyester blocks in the block polymers of the instant invention should be at least 1,000, preferably at least 1,500, and most preferably, at least 2,000.

The weight ratios of the components, i.e. the ratio poly(aryl ether):liquid crystalline polyester may be within the range of 1:9 to 9:1. It is preferably in the range of 2:8 to 8:2, and most preferably in the range of 25:75 to 75:25.

The polymers of the instant invention have a reduced viscosity (RV) of at least 0.25 dl/g as measured in an appropriate solvent. Depending on the type of blocks and on the composition of the block polymer a variety of solvents may be used for the determination of the RV. These solvents are, for example, $CH_2Cl_2$, $CHCl_3$, phenol-tetrachloroethane mixtures, N-methylpyrrolidone, pentafluorophenol, and the like.

The polymers of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The polymers may also include additives such as titanium dioxide; thermal stabilizers, ultraviolet light stabilizers, plasticizers, and the like.

The polymers of this invention may be fabricated into any desired shape, i.e., moldings, coatings, films, or fibers. They are particularly desirable for molding, for fiber, and for use as electrical insulation for electrical conductors.

Also, the polymers may be woven into monofilament threads which are then formed into industrial fabrics by methods well known in the art as exemplified by U.S. Pat. No. 4,359,501. Further, the polymers may be used to mold gears, bearings and the like.

EXAMPLES

The following examples serve to give specific illustrations of the practice of this invention but they are not intended in any way to limit the scope of this invention.

Preparation of Dihydroxy End-capped Poly(aryl ether) Oligomers

General Procedure

The desired amount of dihydric phenol is charged to a flask containing a solvent mixture of monochlorobenzene and dimethyl sulfoxide. The phenol is converted to the disodium salt in situ by adding the required amount of sodium hydroxide. The system is dehydrated by heating and removing the monochlorobenzene-water azeotrope. The desired amount of dihalo benzenoid compound is then added and reacted with the sodium salt of the phenol at about 140° C. The polymer is recovered by filtering the solution, then precipitating, filtering, washing and drying. The molecular weight of the oligomer is controlled by the amounts of the monomers used, and to produce a hydroxy terminated oligomer, a molar excess of the bisphenol is employed. The material is treated with acid, such as oxalic, hydrochloric, or citric acids to convert the terminal —ONa groups to —OH groups.

Using the procedure outline above the following oligomers are prepared:

Oligomer A from excess of 2,2'-bis(4-hydroxyphenyl)propane ("bisphenol-A") and 4,4'-dichlorodiphenyl sulfone, molecular weight of 2,400.

Oligomer B from reagents above, but having a molecular weight of 5,380.

Oligomer C from the reagents above, having a molecular weight of 10,000.

The procedure above is slightly modified in that (a) a higher boiling aprotic solvent (N-methylpyrrolidone or sulfolane) is used instead of the dimethylsulfoxide, and (b) the polycondensation is performed in the presence of the required amount of solid mixtures of $Na_2CO_3$/$K_2CO_3$ at temperatures of up to 220° C.

In this manner oligomer D is prepared. It is made from an excess of 4,4'-dihydroxydiphenyl sulfone and 4,4'-dichlorodiphenyl sulfone and has a molecular weight of 6,000. Similarly, using an excess of 4,4'-biphenyl and 4,4'-dichlorodiphenyl sulfone, oligomer E is prepared. It has a molecular weight of 6,000.

Preparation of the Diacetates of the Hydroxyl-terminated Oligomers

General Procedure

Into a glass lined reactor are charged about 800 gms of the oligomer and 2,000 grams of acetic anhydride. The mixture is heated to about 135° C. and held at this temperature for about 4 hours. Vacuum is then slowly applied to distill acetic acid and excess acetic anhydride. At maximum vacuum (~2 mm), the material temperature is allowed to rise to about 150° C. and held until no further distillation is evident (approximately 30 to 50 minutes). Analysis of the crude product shows that the conversion of the oligomer to the diacetate is 99.9% complete. The material also contains some residual acetic anhydride (usually less than about 1,000 ppm based on the weight of the oligomer diacetate as measured by titration with morpholine as described in Siggia and Hana, "Quantitative Organic Analysis via Functional Groups", Fourth Edition, Wiley-Interscience, 1979, pages 231 to 235).

The diacetates prepared by the procedure above can be used without any further purification for the preparation of the polyether-liquid crystalline polyester block copolymers.

Polymerization via the Diacetate Route

General Procedure

The crude diacetate and the appropriate liquid crystal polyester forming reactants are placed into a reactor. About 40 wt. percent, based on the block copolymer to be produced, of an appropriate processing aid are also charged into the reactor. The system is purged with nitrogen for about 20 minutes and then the heat is turned on to raise the temperature of the reactor to about 270° C. Acetic acid starts to distill when the temperature of the mixture reaches about 255° C. Acetic acid distillation is followed by measuring its level in the receiver. After about 3.5 to 5 hrs. at 270° C., the power draw on the agitator begins to increase which indicates a viscosity increase. The reaction is generally terminated after about 7 to 10 hours; the final temperature being in the range of about 270° C. to about 350° C. The polymer can be isolated by either solvent evaporation using, for example, a twin-screw extruder; it can also be precipitated by coagulation in a non-solvent, e.g. alcohol, acetone, and the like. The reaction mixture may also be diluted with a good solvent, filtered either directly or after treatment with an absorbent such as charcoal, and then isolated by the methods outlined above.

It is to be noted that the preparation of the block copolymers via the ester-exchange route follows a procedure very much similar to that outlined above for the acidolysis polymerization.

Table I lists the polymers that are prepared. Their properties are also shown.

TABLE I

| Oligomer | Liquid crystal polyester reactant(s) (mole ratio) | Weight ratio of blocks (Polyether/Polyester) | Properties | | |
|---|---|---|---|---|---|
| | | | Mechanical | Thermal Stability | Solvent and chemical resistance |
| A | HO—⟨phenyl⟩—COOH + HO—⟨naphthyl⟩—COOH (75:25) | 1:1 | Very good | Very good | Good |
| B | HO—⟨phenyl⟩—COOH | 6:4 | Very good | Very good | Good |
| C | HOOC—⟨phenyl⟩—OH + COOH—⟨phenyl⟩—COOH (meta) + COOH—⟨phenyl⟩—COOH (para) | 8:2 | Excellent | Very good | Moderate |

TABLE I-continued

| | Liquid crystal polyester reactant(s) | Weight ratio of blocks (Poly- | Properties | | |
|---|---|---|---|---|---|
| Oligomer | (mole ratio) | ether/Polyester) | Mechanical | Thermal Stability | Solvent and chemical resistance |
| | HO—⌬—⌬—OH (1:0.2:0.8:1.00) | | | | |
| D | HO—⌬—COOH + | 3:7 | Good | Excellent | Excellent |
| | HO—[naphthalene]—COOH (75:25) | | | | |
| E | As above (under D) | 1:1 | Excellent | Excellent | Excellent |
| F | HOOC—⌬—COOH + | 1:1 | Excellent | Excellent | Excellent |
| | HO—⌬(C₆H₅)—OH + | | | | |
| | COOH—[naphthalene]—COOH (0.5:1.00:0.5) | | | | |

*In all of the examples a small additional amount of terephthalic acid equivalent to the amount of the particular oligomer is used.

What is claimed is:

1. A block copolymer comprising a poly(aryl ether) block and a liquid crystalline polyester block.

2. A block copolymer as defined in claim 1 wherein the poly(aryl ether) contains recurring units of the formula:

—O—E—O—E' wherein E is the residuum of a dihydric phenol, and E' is the residuum of a benzenoid compound having an inert electron withdrawing group in at least one of the positions ortho and para to the valence bonds; both of said residua being valently bonded to the ether oxygens through aromatic carbon atoms.

3. A block copolymer as defined in claim 2 wherein the dihydric phenol is characterized as having the structure:

$$\begin{array}{cc}(R_1)_c & (R'_1)_c\\ | & |\\ HO(Ar-R_2-Ar)OH\end{array}$$

wherein Ar is an aromatic group, $R_1$ and $R'_1$ can be the same or different inert substituent groups selected from alkyl groups having from 1 to 4 carbon atoms, aryl, halogen atoms, or alkoxyl radicals having from 1 to 4 carbon atoms, the c's are independently integers having a value of from 0 to 4, inclusive and $R_2$ is representative of a bond between aromatic carbon atoms as in dihydroxyldiphenyl, or is a divalent radical selected from —O—, —S—, —S—S— —SO—, $$\begin{array}{c}O\\ \|\\ -C-,\end{array}$$

—SO₂, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and radicals fused to both Ar groups.

4. A block copolymer as defined in claim 3 wherein the dihydric phenol has the following structure:

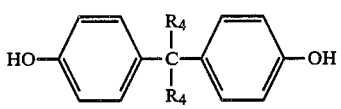

in which the $R_4$ groups represent independently hydrogen, lower alkyl, aryl and the halogen substituted groups thereof, which can be the same or different.

5. A block copolymer as defined in claim 3 wherein the dihydric phenol is selected from the following:

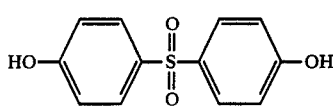

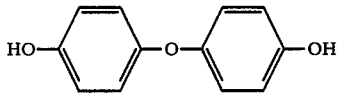

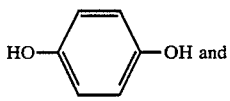

and substituted derivatives thereof.

6. A block copolymer as defined in claim 2 wherein the benzenoid compound is selected from the following:

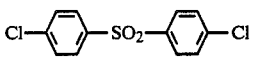

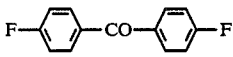

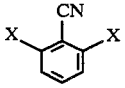

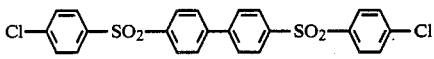

wherein X is chlorine or fluorine.

7. A block copolymer as defined in claim 1 wherein the poly(aryl ether) block has the following repeating unit:

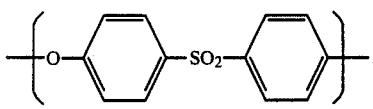

8. A block copolymer as defined in claim 1 wherein the poly(aryl ether) block has the following repeating unit:

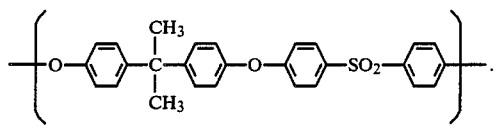

9. A block copolymer as defined in claim 1 wherein the poly(aryl ether) block has the following repeating unit:

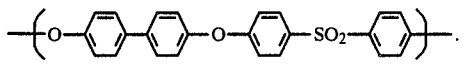

10. A block copolymer as defined in claim 1 wherein the poly(aryl ether) block has the following repeating unit:

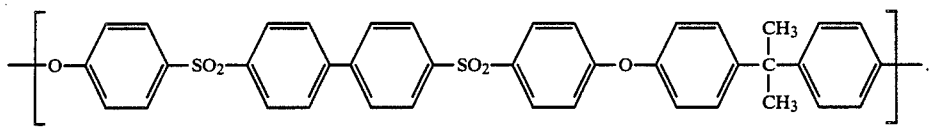

11. A block copolymer as defined in claim 1 wherein the liquid crystalline polyester oligomer block is derived from one or more of the following: p-hydroxy benzoic acid, m-hydroxy benzoic acid, terephthalic acid, isophthalic acid, hydroquinone, phenyl hydroquinone, alkyl substituted hydroquinones, halo substituted hydroquinones, 4,4'-dihydroxydiphenyl ether, resorcinol, 4,4'-biphenol, 2,6-naphthalene diol, 2,6-naphthalene dicharboxylic acid, 6-hydroxy-2-naphthoic acid and 2,6-dihydroxy anthraquinone.

12. A block copolymer as defined in claim 1 wherein the liquid crystalline polyester block is a copolymer derived from p-hydroxy benzoic acid.

13. A block copolymer as defined in claim 1 wherein the liquid crystalline polyester block is a copolymer derived from p-hydroxybenzoic acid, terephthalic and isophthalic acids, and 4,4'-biphenol.

14. A block copolymer as defined in claim 1 wherein the liquid crystalline polyester block is a copolyester derived from p-hydroxybenzoic acid and 6-hydroxy-2-naphthoic acid in a 75/25 molar ratio.

15. A block copolymer as defined in claim 1 werein the liquid crystalline polyester block is a copolymer derived from terephthalic acid, hydroquinone, and methylhydroquinone.

16. A block copolymer as defined in claim 1 wherein the liquid crystalline polyester block is a copolymer derived from terephthalic acid, hydroquinone and phenylhydroquinone.

17. A block copolymer as defined in claim 1 wherein the liquid crystalline polyester block is a copolymer derived from terephthalic acid, 2,6-naphthalene dicarboxylic acid and phenyl hydroquinone.

18. A block copolymer as defined in claim 1 wherein the liquid crystalline polyester block is a copolymer derived from terephthalic acid, methyl hydroquinone and meta-hydroxybenzoic acid.

19. A process for preparing a block copolymer comprising a poly(aryl ether) oligomer block and a liquid crystalline polyester block which comprises the following steps:

(a) reacting the dihydroxy terminated oligomer HO(EOE'O)$_n$EOH with an anhydride of a lower carboxylic acid (R$_5$CO)$_2$O to form the diester R$_5$COO(EOE'O)$_n$EOCOR$_5$, (b) reacting the product from (a) with the diester R$_5$COOArOCOR$_5$ and the dicarboxylic acid HOOCAr$_1$COOH under acidolysis conditions, and (c) recovering the block copolymer, and wherein E and E' are as defined in claim 1, R$_5$ is lower alkyl and Ar and Ar$_1$ are divalent aromatic radicals which are residues of the diphenol and diacid components of the liquid crystalline polyester segments.

20. A process as defined in claim 19 wherein steps (a) and (b) are performed in a one-pot operation.

21. A process as defined in claim 19 wherein R$_5$ is methyl.

22. A process as defined in claim 19 wherein step (b) is carried out at a temperature of from about 200° C. to about 350° C.

23. A process as defined in claim 19 wherein the molecular weight is advanced by solid state polymerization.

24. A process as defined in claim 19 wherein step (b) is carried out in the presence of a catalyst.

25. A process as defined in claim 24 wherein the catalyst is selected from the dialkyl tin oxide, diaryl tin oxide, titanium dioxide, antimony trioxide, alkoxy titanium silicates, titanium alkoxides, alkali and alkaline earth metal salts of carboxylic acids, Lewis acids and hydrogen halides.

26. A process as defined in claims 24 or 25 wherein the catalyst is used in amounts of from about 0.001 to about 1 percent by weight based upon the total monomer weight.

27. A process for preparing a block copolymer comprising a poly(aryl ether) block and a liquid crystalline polyester block which comprises the following steps:

(a) reacting the dihydroxy-terminated oligomer HO(EOE'O)$_n$EOH with the diphenol HOArOH and the diaryl ester Ar$_2$OCOAr$_1$COOAr$_2$ at a temperature of from about 200° C. to about 350° C., and (b) recovering the block copolymer, and wherein E and E' are as defined in claim 2, Ar and Ar$_1$ are as defined in claim 19 and Ar$_2$ is a monovalent aromatic group.

28. A process as defined in claim 27 wherein the process is performed in a one-pot operation.

29. A process as defined in claim 27 wherein Ar$_2$ is phenyl.

30. A process as defined in claim 27 wherein the molecular weight is advanced by solid state polymerization.

31. A process as defined in claim 27 which is carried out in the presence of a catalyst.

32. A process as defined in claim 31 wherein the catalyst is an alkali metal phenoxide.

33. A process for preparing a block copolymer comprising a poly(aryl ether) oligomer block and a liquid crystalline polyester block which comprises the following steps:

(a) reacting the dihydroxy-terminated oligomer HO(EOE'O)$_n$EOH with the diphenol HOArOH and the diacid chloride ClCOAr$_1$COCl, and (b) recovering the block copolymer, and wherein E and E' are as defined in claim 2 and Ar and Ar$_1$ are as defined in claim 19.

34. A process as defined in claim 33 which is carried out by an interfacial method.

35. A process as defined in claim 33 which is carried out in a high boiling solvent.

36. A process as defined in claim 35 wherein the high boiling solvent is selected from chlorinated aromatic hydrocarbons, chlorinated diphenyls, diphenyl esters, chlorinated naphthalenes or nonchlorinated aromatics.

37. A process as defined in claim 35 which is carried out in the presence of a catalyst.

38. A process as defined in claim 37 wherein the catalyst is metallic magnesium or tetravalent titanium esters.

* * * * *